March 19, 1946.  Y. SEKELLA  2,397,055
FRICTION CLUTCH FOR A MECHANICAL TIME FUSE
Filed Nov. 26, 1940
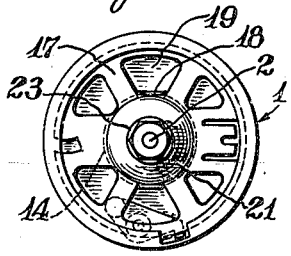
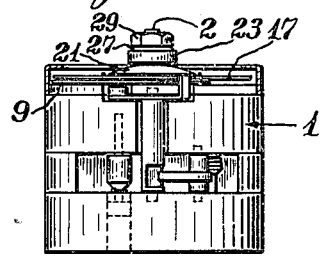
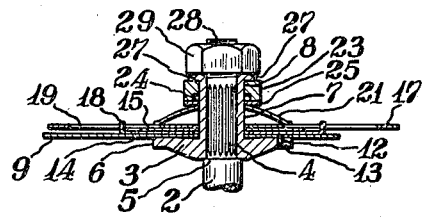
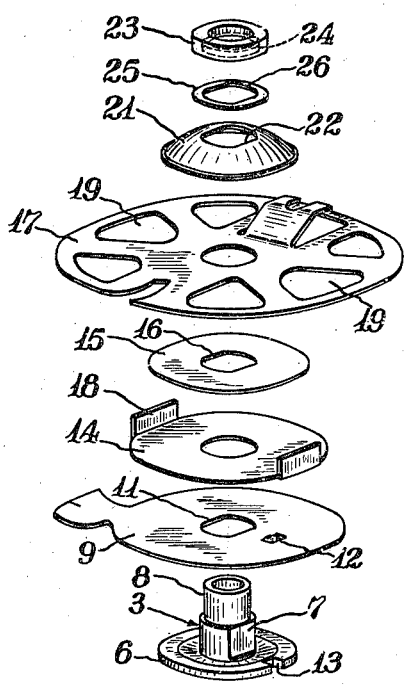
INVENTOR.
Youston Sekella
BY Clinton S. James
ATTORNEY.
Witness:
Burr W. Jones Patented Mar. 19, 1946

2,397,055

UNITED STATES PATENT OFFICE 2,397,055

FRICTION CLUTCH FOR MECHANICAL TIME FUSES

Youston Sekella, Elmira Heights, N. Y., assignor to Bendix Aviation Corporation, South Bend, Ind., a corporation of Delaware Application November 26, 1940, Serial No. 367,175

5 Claims. (Cl. 102—84)

The present invention relates to a friction clutch for a mechanical time fuse and more particularly to a pre-set clutch for connecting the timing disc of a fuse to the chronometric driving means therefor.

In mechanical time fuses it is customary to employ a timing disc rotated by chronometric gearing under the control of an escapement mechanism for effecting the detonation of a projectile after a predetermined time. The fuse is set by rotating the timing disc through an arc corresponding to the desired range, a slip connection being provided between the disc and the chronometric gearing to permit such rotation. It is necessary that this connection be arranged to slip when a torque is applied thereto in the setting operation without causing undue stresses in the parts which are customarily light and subject to deformation. At the same time it is necessary for this connection to connect the timing disc to the chronometric gearing in such manner that there is no possibility of slippage due to rotary accelerational forces on the projectile or the setback of the parts caused by the discharge of the projectile in use.

It is an object of the present invention to provide a novel friction clutch connection between the timing disc and the chronometric gearing of a mechanical time fuse which is accurate and reliable in operation and permanent in adjustment.

It is another object to provide such a device which has a plurality of clutch surfaces of comparatively large area whereby the unit pressures thereon may be comparatively small.

It is another object to provide such a device in which the pressure of the clutch elements is maintained permanently irrespective of vibration or setback effects.

It is a further object to provide such a device in which the frictional elements are so interlocked as to prevent lost motion therebetween such as might impair the accuracy of the setting of the timing disc.

It is another object to provide such a device in which the parts are of simple construction adapted to rapid and economical methods of manufacture.

Further objects and advantages will be apparent from the following description taken in connection with the accompanying drawing in which:

Fig. 1 is a side elevation partly broken away and in section showing a conventional form of mechanical time fuse embodying a preferred form of the present invention;

Fig. 2 is a top plan view of the same;

Fig. 3 is an enlarged sectional view of the chronometric shaft, the timing disc and the clutch connection therebetween; and Fig. 4 is an expanded view showing the timing disc with its clutching elements in disassembled relation.

In Fig. 1 of the drawing there is illustrated a fuse body indicated generally by numeral 1 and containing chronometric gearing, not illustrated, for driving a centrally located shaft 2 at a predetermined rotative speed during the flight of the projectile. A sleeve 3 (Fig. 3) is fixed on the end of the chronometric shaft 2 in any suitable manner as by means of the formation of longitudinal flutes 4 on a reduced section of the shaft 2, which flutes are arranged to imbed themselves in the interior of the sleeve 3 when the sleeve is forced on the end of the shaft against a shoulder 5 forming an abutment for the sleeve.

Sleeve 3 is provided with a radial flange 6 at one end (Fig. 4), a portion 7 of non-circular cross section adjacent thereto, and a reduced cylindrical extension 8. A driving disc 9 is non-rotatably mounted on the sleeve 3 in abutting relation with the flange 6, and is immovably anchored to the sleeve both by means of the formation of a central opening 11 closely conforming to the non-circular portion 7 of the sleeve and also by means of a lug 12 engaging tightly in a notch 13 in the periphery of the flange 6.

A driven disc 14 is rotatably mounted on the sleeve 3 in frictional engagement with the driving disc 9, and a second driving disc 15 having an opening 16 closely conforming to the non-circular portion 7 of the sleeve 3 is non-rotatably mounted on said sleeve in frictional engagement with the driven disc 14. A timing disc 17 is rotatably mounted on the sleeve 3 in frictional engagement with the second driving disc 15 and is rigidly connected to the driven disc 14 by means of lugs 18 extending axially from the periphery of the driven disc into tapered openings 19 in the timing disc whereby these elements are rigidly coupled together without lost motion.

Means for holding the disc in uniform frictional engagement is provided in the form of a dished spring washer 21 bearing on the upper side of the timing disc 17 and non-rotatably connected to the sleeve 3 by means of a central opening 22 conforming to the non-circular portion 7 of the sleeve. A thrust collar 23 is mounted on the reduced cylindrical extension of the sleeve 3 and is provided with a counterbore 24 (Fig. 3) permitting longitudinal adjustment of the collar over the end of the non-circular portion 7 of the sleeve. A washer 25 having an opening 26 conforming to the non-circular portion 7 of the sleeve is interposed between the thrust collar 23 and the spring washer 21, and the parts are held in assembled relation by spinning or beading over the end of the sleeve as shown at 27 in Fig. 3. It will be understood that the operation of forming the bead or flange 27 is performed by a suitable forming tool while the sleeve is being rotated and the disc 17 held stationary in a fixture which permits observation of the torque being transmitted to the timing disc. By this means the spinning operation may be continued until the proper frictional connection between the sleeve and the timing disc is secured. A rigid and permanent adjustment of this frictional connection is thus assured.

The end of the chronometric shaft 2 is preferably threaded as shown at 28 and a nut 29 placed thereon to reenforce the bead 27 and prevent the possibility of loss of adjustment or loosening of the parts by reason of secondary setback effects.

Inasmuch as the lug 12 is a force fit in the notch 13 of flange 6, and the lugs 18 are tightly wedged in the tapered openings 19 of the timing disc, it will be seen that there is no lost motion between the parts so connected such as might impair the accuracy of setting of the timing disc.

The areas of the frictional surfaces are quite large so that a moderate axial pressure of the spring washer 21 will provide a reliable frictional connection which may be therefore quite accurately calibrated. Moreover, since there are several frictional surfaces involved, slight variations in the condition of any one frictional surface will be averaged in such a manner as to facilitate uniformity in action of the frictional connection.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In a mechanical time fuse for explosive projectiles, a chronometric drive shaft, a sleeve fixed thereon having a portion of non-circular cross section and a reduced cylindrical extension, a friction driving disc non-rotatably mounted on the non-circular portion of the sleeve, a driven disc rotatably mounted on the sleeve adjacent the first disc, a second driving disc non-rotatably mounted on the sleeve adjacent the driven disc, a timing disc rotatably mounted on the non-circular portion of the sleeve adjacent the second driving disc, said timing disc and driven disc having interengaging means connecting them for rotation in unison, and yielding means mounted on the sleeve pressing the discs into frictional engagement.

2. In a mechanical time fuse for explosive projectiles, a chronometric drive shaft, a sleeve fixed thereon having a portion of non-circular cross section and a reduced cylindrical extension, a friction driving disc non-rotatably mounted on the non-circular portion of the sleeve, a driven disc rotatably mounted on the sleeve adjacent the first disc, a second driving disc non-rotatably mounted on the sleeve adjacent the driven disc, a timing disc rotatably mounted on the non-circular portion of the sleeve adjacent the second driving disc, said timing disc having openings and said driven disc having lugs engaging said openings, and yielding means pressing the discs into frictional engagement.

3. A mechanical time fuse for explosive projectiles as set forth in claim 2 in which the yielding means comprises a dished spring washer, and thrust means cooperating therewith retained on the cylindrical extension of the sleeve by spinning over the end of the sleeve.

4. In a mechanical time fuse for explosive projectiles, a chronometric shaft having a reduced extension, a sleeve fixed on said extension, a pair of driving discs non-rotatably mounted on said sleeve, a driven disc rotatably mounted on the sleeve between the driving discs, a timing disc rotatably mounted on the sleeve and connected for rotation with the driven disc, and yielding means pressing the discs into frictional engagement, said timing disc having tapered openings and the driven disc having peripheral lugs extending axially into said openings and being wedged tightly therein to rigidly connect the driven disc to the timing disc.

5. A mechanical time fuse as set forth in claim 4 in which the yielding means comprises a dished spring washer non-rotatably mounted on the sleeve adjacent the timing disc, a spacing thrust collar rotatably mounted on the sleeve and a flange formed on the end of the sleeve to maintain a constant pressure on the thrust members.

YOUSTON SEKELLA.